Feb. 3, 1970 P. K. WEIMER 3,493,812

INTEGRATED THIN FILM TRANSLATORS

Filed April 26, 1967 7 Sheets-Sheet 1

INVENTOR
PAUL K. WEIMER

BY [signature]

ATTORNEY

INVENTOR
PAUL K. WEIMER
BY
[signature]
ATTORNEY

Feb. 3, 1970 P. K. WEIMER 3,493,812

INTEGRATED THIN FILM TRANSLATORS

Filed April 26, 1967 7 Sheets-Sheet 3

INVENTOR
PAUL K. WEIMER

BY [signature]

ATTORNEY

INVENTOR
PAUL K. WEIMER
BY
ATTORNEY

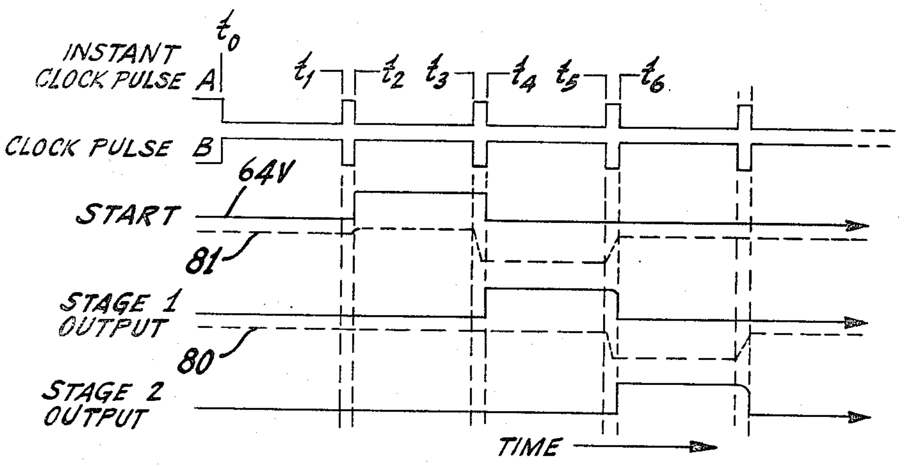
FIG. 8.
FIG. 14.
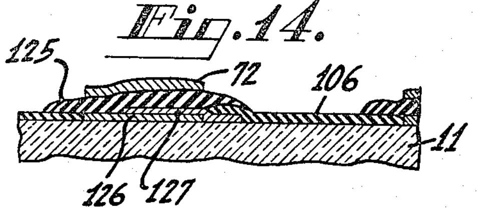
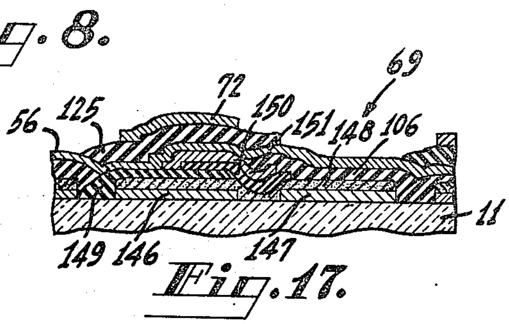
FIG. 17.
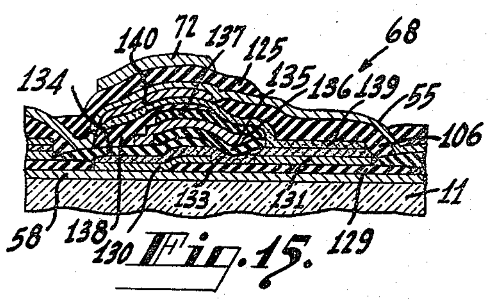
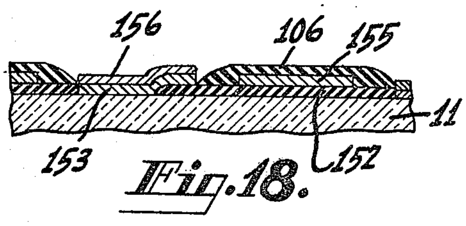
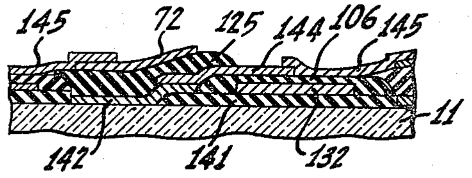
FIG. 16.
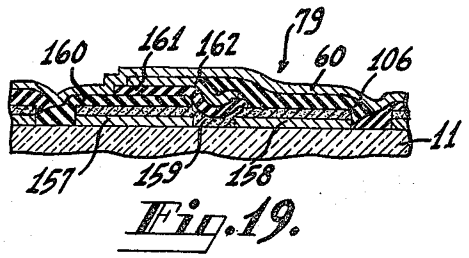
FIG. 19.
INVENTOR
PAUL K. WEIMER
BY [signature]
ATTORNEY

INVENTOR
PAUL K. WEIMER

BY [signature]
ATTORNEY

Feb. 3, 1970 P. K. WEIMER 3,493,812
INTEGRATED THIN FILM TRANSLATORS
Filed April 26, 1967 7 Sheets-Sheet 7

INVENTOR
PAUL K. WEIMER

BY [signature]
ATTORNEY 3,493,812
Patented Feb. 3, 1970

3,493,812

INTEGRATED THIN FILM TRANSLATORS

Paul K. Weimer, Princeton, N.J., assignor to RCA Corporation, a corporation of Delaware Filed Apr. 26, 1967, Ser. No. 633,904
Int. Cl. H05b *37/00, 39/00, 41/00*
U.S. Cl. 315—169 23 Claims

ABSTRACT OF THE DISCLOSURE

A thin film construction for an integrated, solid state, digitally scanned image sensor or display has a layout in which all transistors in a given stage of its digital scan generators have their respective gates in mutual alignment along a common axis in order to minimize space and allow each output stage of the scan generator to be substantially aligned geometrically with a picture element in the image area. The digital scan generators employ complementary-symmetry inverters and a space-saving construction for these devices is also included.

The scan generators are each constructed with multiple bus bars, so that, by selective interconnection of these bus bars externally of the scan generators, the circuit can be set up to operate in one of at least two different modes.

Buffering inverters are interposed between the scan generators and the image area so that shorts or open circuits in the image area cannot adversely affect the operation of the scan generators.

Background of the invention

The invention herein described was made in the course of or under a contract or subcontract thereunder with the Department of the Air Force. The invention relates to thin-film integrated circuits. More particularly, the invention pertains to integrated thin-film structures useful in devices such as solid state image sensor or display panels.

Television pickup and display have been accomplished heretofore by means of vidicon tubes and cathode ray tubes, in each of which scanning of the image is done by means of a deflected electron beam. The replacement of the electron beam of a cathode ray tube by an X–Y array of address strips driven by two orthogonal generators has been proposed as early as 1930. See Nicolson, U.S. 1,779,748, Oct. 23, 1930. Structures as described in that patent have heretofore been impractical because of the complexity of the circuits and structures required to carry them out. However, the recent advent of completely integrated thin-film circuits has reactivated interest in this approach to television pickup and display.

A solid state electro-optical translating device, that is, an image sensor or display, should have good optical resolution. Moreover, such a device should have good resolution in a relatively small image area, so that it can be compatible with micro-miniaturized circuit elements. Among other things, these features require compact scan generators which have very narrow and closely spaced output stages which can be coupled directly to the conductors in the image area of the device without the geometrical problems of "fan in" and without significantly enlarging the total area occupied by the device. In addition to being compact, a solid state image sensor or display should lend itself to efficient fabrication by conventional methods.

The layouts of the scan generators of prior devices are such that conductors must be made quite narrow in order to occupy the required space with adequate isolation. Spacing tolerances must be closely controlled for the same reason. These factors limit the degree of compactness which can be achieved in such prior devices.

Summary of the invention

The structure and circuit to be described hereinafter provide for extreme compactness in an electro-optical image translating device. One feature of the present structure is a space-saving construction for a component thereof which includes both a P type and an N type field effect transistor. The elements of one transistor are deposited on top of those of the other, and the gates and drains of the two transistors are common, that is, they are constituted by the same element.

Another feature of the present structure is an improved layout for a solid state digital scan generator. The improved scan generator includes a predetermined number of insulated gate field effect transistors making up a plurality of output stages. The transistors are arranged in a rectangular array of columns and rows, and each column comprises one stage of the scan generator. Within each column the several transistors are all oriented with the centers of their respective gates aligned along a common axis. All of the transistors in a particular row conduct by the same type of charge carriers and serve the same function in each stage. The columns each have a width equal to the sum of the width of a single transistor, measured in the direction of current flow, that is, the width of the source electrode and drain electrode and the gap between them, plus a narrow spacing to insure isolation of one column from the columns adjacent to it. The rows are also closely spaced and, as a further feature of the present device, the total area occupied by the scan generator is reduced by employing a construction in which interconnecting bus bars overlie and/or underlie the transistors to which they connect.

Another feature of the present device is the use of multiple bus bars arranged in such a way that by selective external interconnection of the bus bars the scan generators may be set up to operate in different ways. In a preferred arrangement, the external connections provide a circuit which propagates a pulse in such a way that no pulse overlaps a preceding or a succeeding one.

Another feature of this device is a novel circuit which can provide unique picture information for each scan cycle of the device and in which the scan generators thereof are isolated from the image area by complementary pair inverters so that short circuits or open circuits in the image area will not adversely affect the operation of the scan generators.

The drawing

FIGURE 8 is a pulse diagram illustrating the mode of operation of the scan generators shown in FIGURE 7;

FIGURES 10 through 21 are cross sections on the correspondingly numbered section lines in FIGURE 9.

Preferred embodiments

Figure 1:
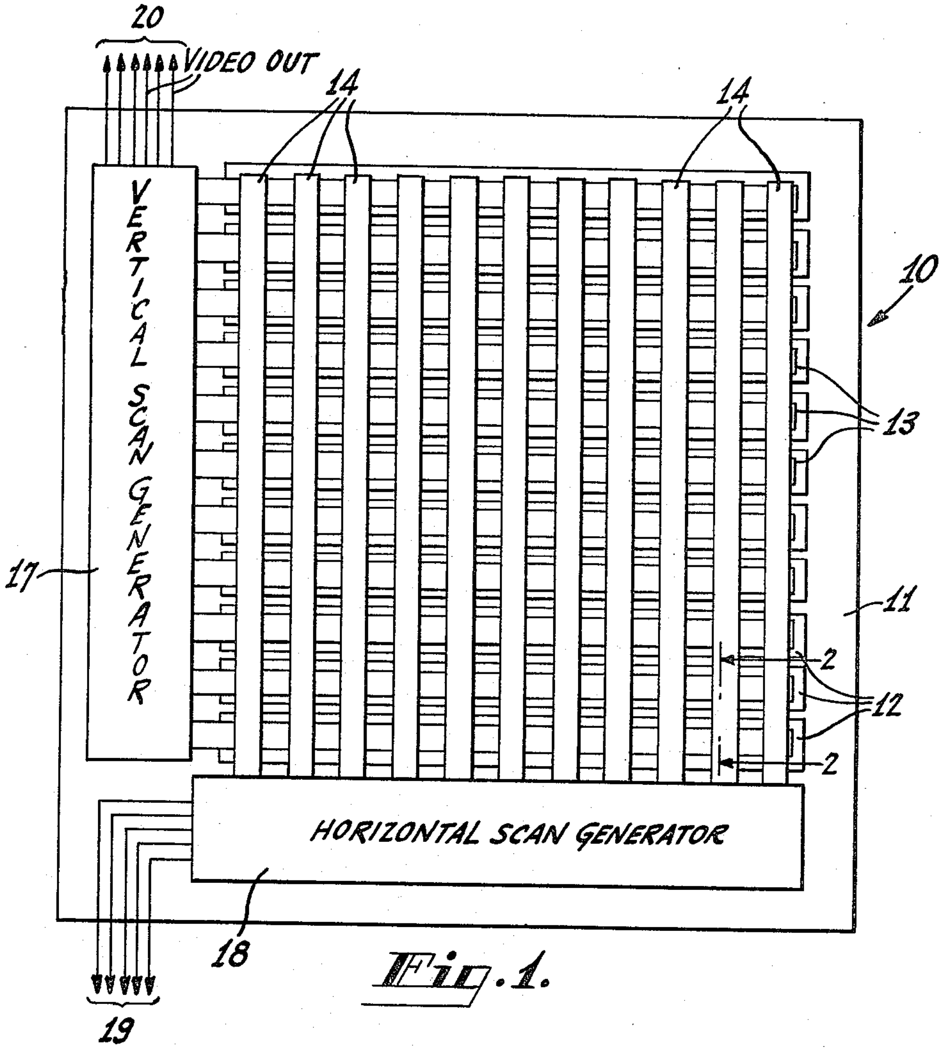
FIGURE 1 is a partially diagrammatic plan view of the present solid state electro-optical translating device.

A preferred form of the present device, embodied as an image sensor panel, is indicated generally by numeral 10 in FIGURE 1.

The image sensor panel 10 comprises a transparent, insulating substrate 11 of glass, for example, on which the components of the device are deposited, as by conventional thin film techniques. Strips of photoconductive material 12, preferably of cadmium sulfide, are deposited on the substrate 11 and are contacted at a substantial number of points by a plurality of row conductors 13 and a plurality of column conductors 14.

Figure 2:
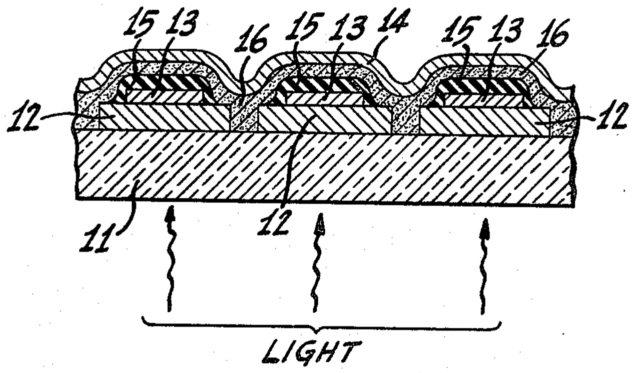
FIGURE 2 is a cross sectional view on line 2—2 of FIGURE 1.

The construction of the image area of the device 10 is such as to provide a series combination of a photoconductor and a diode at each intersection between the respective row conductors 13 and the column conductors 14. Thus, as shown in FIGURE 2, each row conductor 13 has deposited over it an insulating strip 15, each strip 15 extending over one edge of a photoconductive strip 12 but not covering a portion of the upper surface of the strip 12 adjacent the opposite edge.

Extending in the column direction beneath each column conductor 14 is a blocking layer 16 which is in contact with the photoconductive strips 12 where they are not covered by the insulating strips 15. The blocking layers 16 are of a material capable of forming a rectifying contact with the photoconductive strips 12; and, where the material of the strips 12 is cadmium sulfide, the material of the blocking layers 16 may be tellurium, for example. The column conductors 14 are disposed over the blocking layers 16 as shown in FIGURE 2.

In the operation of the device 10, an image is focused on the photoconductive strips 12 by means of suitable optics, preferably through the glass substrate 11, and the conductivity of each of the individual elements of the photoconductive strips 12 at the various junctions between the row and column conductors will consequently be varied in proportion to the amount of light falling on it. Digital scanning means then sequentially measures the conductivity of each such element in order to secure a video signal.

The image area is scanned (FIGURE 1) by means of a vertical scan generator 17 and a horizontal scan generator 18, each of which comprises a plurality of identical subcircuits or stages each having an output adapted to be connected to one of the row or column conductors 13 or 14. The subcircuits are each capable of transferring a scanning pulse from one subcircuit to the next at a predetermined rate. Ordinarily, vertical scan generator 17 is operated at a slow rate relative to the horizontal scan generator 18, so that each row conductor 13 is coupled to the video output circuitry for a predetermined time during which the horizontal scan generator 18 operates to sequentially activate each of the column conductors 14. The vertical scan generator 17 then shifts to the next conductor 13 and the horizontal scan generator 18 again activates the column conductors 14, so that each of the individual picture elements in the image area is scanned in sequence.

Leads 19 are provided to connect the horizontal scan generator 18 to suitable external operating circuitry and leads 20 provide operating signals for the vertical scan generator 17 and serve to conduct the video signal out to a suitable transmitter. Further details of the image sensor panel 10 and its operation will be given in the explanation of FIGURE 7 below.

Complementary-pair inverter

Figure 3:
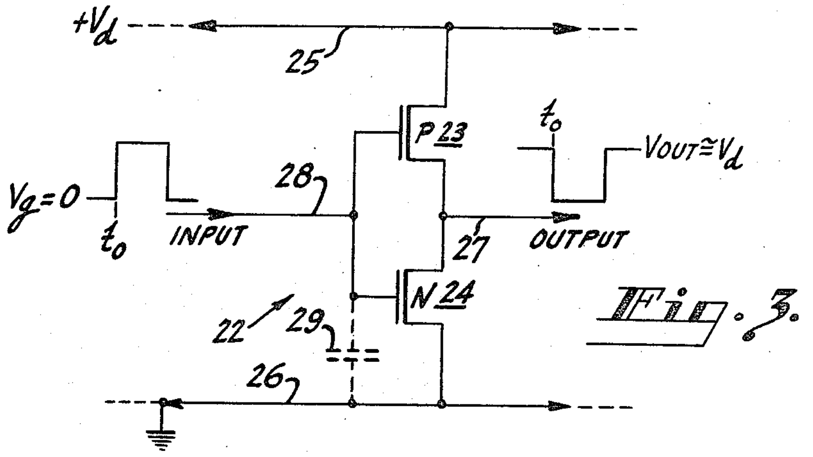
FIGURE 3 is a circuit diagram of a complementary pair inverter circuit which may be used in the scan generators of this device.

A basic element of the solid state scan generator structure used in the scan generators 17 and 18 is a complementary-pair inverter, an example of which is represented electrically by the circuit 22 shown in FIGURE 3. The circuit 22 has as its active elements a complementary pair of insulated gate enhancement type field effect transistors, consisting of a P type transistor 23 and an N type transistor 24, which are connected across a source of electrical potential, suitable connection means being represented in FIGURE 3 by the leads 25 and 26. The respective drains of the transistors 23 and 24 are connected to each other and to an output lead 27, while the gates of the transistors are connected to each other and to an input lead 28.

For some applications, and particularly for the scan generators to be described hereinafter, a means for storing charge on the gates of the transistors 23 and 24 is desirable. This is represented in FIGURE 3 by the capacitance means 29, shown in dotted lines, effectively coupled between the gates of the transistors 23 and 24 and the lead 26. As will appear below, the capacitance means 29 is an integral part of the structure of the inverter.

In the operation of the circuit 22, the lead 25 is ordinarily held at a high potential, $+V_d$, relative to the lead 26 by means of an external source of electrical potential, not shown. If an input voltage, $V_g$, which is low relative to the voltage $V_d$ is applied to the input lead 28, the P type transistor 23 will have a large negative gate-to-source voltage and will consequently have a high conductance. Under the same conditions, the N type transistor will have substantially no gate-to-source voltage difference and will be cut off. Accordingly, the voltage on the output lead 27 will be relatively high, the transistor 23 acting as a closed switch to connect the output lead 27 to the lead 25. If the input voltage is high relative to $V_d$, the P type transistor 23 will be cut-off, the N type transistor 24 will be conductive, and the output lead 27 will be effectively connected to the lead 26.

The inverting action of the circuit 22 should thus be apparent. If an input pulse goes from relatively low voltage to relatively high voltage at time $t_o$, and subsequently goes back to low voltage as shown in FIGURE 3, an output pulse is produced which goes low at time $t_o$ and returns to a relatively high condition when the input pulse returns to its low state. Of course, when the capacitance 29 is present, it will be charged by the input pulse and will hold the gate of the transistors 23 and 24 at a relatively high potential as long as the charge is held.

Figure 4:
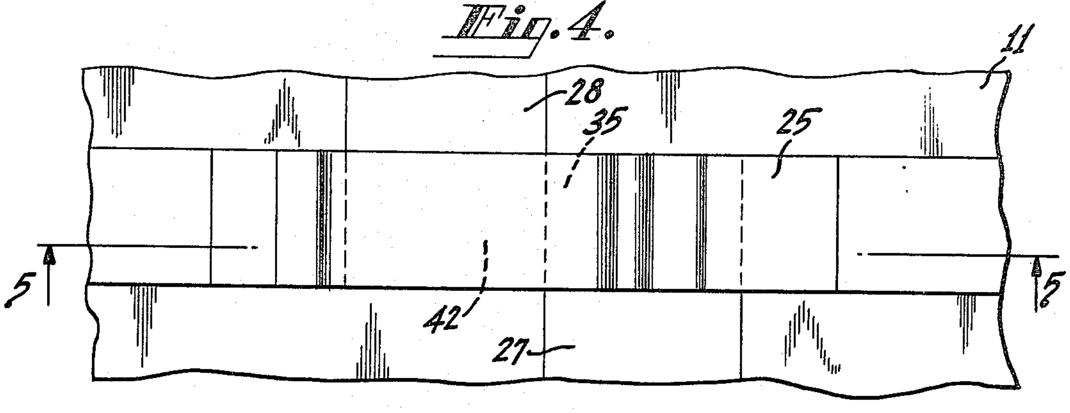
FIGURE 4 is a plan view of a preferred construction of a solid state inverter embodying the circuit of FIGURE 3.
Figure 5:
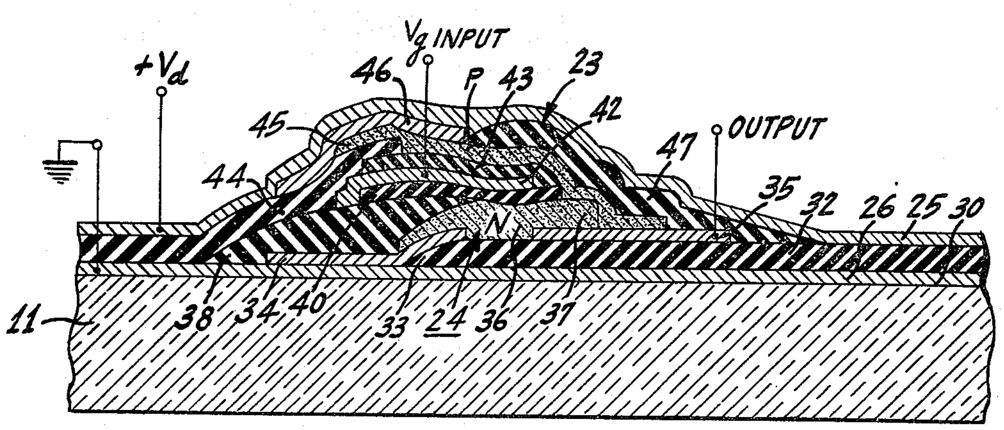
FIGURE 5 is a cross section on the line 5—5 of FIGURE 4.

The preferred construction for the circuit 22 is illustrated in FIGURES 4 and 5. As stated generally above, an object of the present construction is to include a substantial amount of circuitry in a very small space and this object is particularly well achieved by the construction shown in FIGURES 4 and 5. To aid in correlating the structure with the circuit diagram, the same reference numeral is applied to both the structural and the diagrammatic showing of the same or a corresponding element.

The substrate on which the circuit elements are deposited is again designated by numeral 11 of FIGURES 4 and 5. In the plan view of FIGURE 4, an input gate lead 28 and an output drain lead 27 are deposited as metal layers or films on the substrate 11 in the relatively vertical direction. A source bus 25 also appears in FIGURE 4, this bus extending in a relatively horizontal direction. The bus 25 is a deposited metal layer or film which lies vertically above the remaining elements of the inverter, as will be appreciated from the cross sectional showing of FIGURE 5.

As shown in FIGURE 5, the substrate 11 has an upper surface 30 on which are deposited the various layers of material forming the inverter. In the present embodiment, the first layer deposited on the surface 30 is a metal strip which constitutes the ground bus 26. Overlying the bus 26 is a layer of insulating material 32 which has a terminal end 33, as shown. A relatively short length of deposited metal 34, constituting a first source electrode, is deposited partially on the bus 26 and in overlapping relation to the end 33 of the insulating layer 32. A terminal portion 35 of the drain lead 27 is positioned on the insulating layer 32 and constitutes a drain electrode spaced from the source electrode 34 so as to define a gap 36.

The next layer above the source electrode 34 and the drain electrode portion 35 is a layer of semiconductive matrial 37, which fills the gap 36 and serves to conductively join the source electrode 34 and the drain electrode portion 35 of the drain lead 27. In this embodiment, the material 37 is of N type conductivity.

Insulating layers 38 and 40 are the next layers above the source electrode 34 and the semiconductive layer 36 respectively and the gate lead 28 is positioned with its terminal end portion 42, extending in overlapping relation to the source electrode 34 and the gap 36 so as to consitute a gate electrode. The insulating layers 38 and 40 are built up as shown in order to provide predetermined amounts of capacitance between the gate electrode 42 and the semiconductive layer 36 and the source electrode 34, respectively. The insulating layer 40 constitutes the gate insulator of the N type transistor 24 and as such extends over th: gap 36 so as to insulate the gat electrode 42 from the semiconductive layer 37 at that location. As shown, the gate electrode 42 overlies a substantial portion of the source electrode 34 and is insulated therefrom primarily by the insulating layer 38. This structure provides a parallel plate capacitor as the capacitance 29.

The P type transistor 23 of the pair comprises the next succession of layers superposed above the N type transistor. Thus, insulating layers 43 and 44 are disposed above the gate electrode 42 and the insulating layer 38 as shown. The insulating layer 43 is the gate insulator for the P type transistor 23 and the insulator layer 44 is a supporting and standoff insulator for the later deposited layers.

A layer 45 of P type semiconductive material is positioned in overlying relation to a portion of the insulating layer 44, the gate insulating layer 43, the drain end of the N type layer 37, and drain electrode 35. A second source electrode 46 is disposed vertically above the first-mentioned source electrodes 34 and is in contact with the P type layer 45. Finally, a standoff insulating layer 47 is provided and the bus 25 is the last layer above the insulating layer 44, the second source electrode 46 and the standoff insulator 47 to complete the structure of the inverter. Suitable connections may be made to the leads 27 and 28 and the busses 25 and 26 in order to apply operating voltages to the inverter.

It will be apparent that by superimposing the P type transistor on the N type transistor, with the gate electrodes and drain electrodes each transistor constituted by a single layer of metal, and by sandwiching both of these transistors between the respective busses 25 and 26, a minimum of surface area on the substrate 11 is occupied by the device. Actually, the device takes up no more lateral space than would be occupied by a single thin film transistor.

Scan generator circuit

Figure 6:
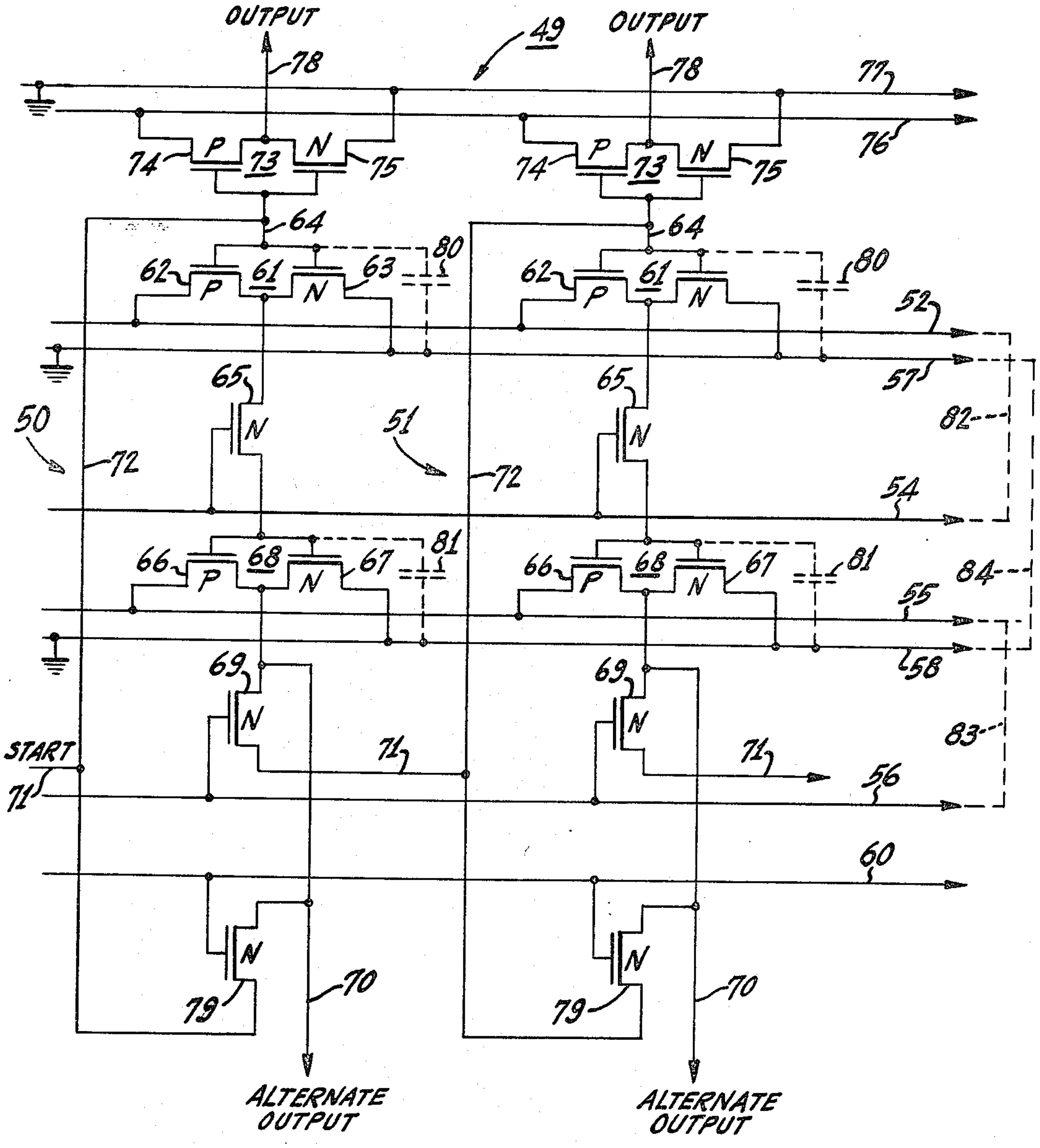
FIGURE 6 is a circuit diagram illustrating two stages of either of the scan generators.

A generalized circuit 49 illustrating the structure of two subcircuits or stages 50 and 51 of the integral scan generators 17 or 18 is illustrated in FIGURE 6. The circuit includes a multiple bus bar arrangement so that, by means of external interconnections between the busses, the circuit may be made to operate in any one of several different modes, as will be apparent hereinafter.

The circuit 49 has parallel bus bars 52, 54, 55, and 56 adapted to be connected to the relatively high sides of two external pulsed voltage sources. Two ground busses 57 and 58 and a feedback control bus 60 are also provided.

Stages 50 and 51 are identical and each comprises a first complementary-pair inverter circuit 61 comprising a series combination of a P type transistor 62 and an N type transistor 63 connected between the bus 62 and one of the ground busses, 57. The respective gates of the transistors 62 and 63 are connected to an input lead 64 and their drains are connected to the drain of a N type coupling transistor 65, the purpose of which will be explained hereinafter. The terms "source" and "drain" are used loosely herein to designate the two electrodes of each transistor. Electrically, in some of the transistors, the electrodes alternate from time to time in the functions of source of and drain for majority carriers.

The gate of the transistor 65 is connected to the bus 54 and the source of this transistor is connected to the respective gates of a P type transistor 66 and an N type transistor 67 in a second complementary-pair inverter 68. The transistors 66 and 67 are connected in series between the leads 55 and the other ground bus, 58. The drains of the transistors 66 and 67 are connected to the drain of a second N type transistor 69 and to a lead 70, which may be used as the output lead of the stage when it is operated in one of its modes. The coupling transistor 69 has its gate connected to the bus 56 and its source connected to a lead 71, which is in turn connected, via a lead 72, to the input lead 64 of the next succeeding stage. The coupling transistor 69 is also connected, via the leads 71 and 72, to a complementary-pair inverter 73 having a P type transistor 74 and an N type transistor 75, connected in series between a bus 76 and a ground bus 77. The drains of the transistors 74 and 75 are connected to an output lead 78 for connecting the circuit to the image area to be scanned. Use of the inverters 73 is optional, the function of these devices being to isolate the scan generator from shorts or open circuits in the image area being scanned. In the present layout, each of the inverters 73 constitutes an output inverter for the preceding scan generator stage, i.e., the inverter 73 at the top of the column of inverters and transistors making up the stage 51 is the output inverter for stage 50, and so forth.

A feedback transistor 79 of N conductivity type, has its drain connected to the lead 70 and its source connected, via the lead 72, to the lead 64 and, consequently, to the gates of the transistors 62 and 63, in order to apply the output of the transistors 66 and 67 to the input of the circuit in a feedback relationship. The feedback transistor 79 is controlled by a signal applied to its gate from the bus 60. When the transistor 79 is rendered conductive, the stage functions as a bistable flip-flop, allowing the circuit to operate as a shift register.

Capacitance means, represented by the capacitors 80 and 81 shown in dotted lines, are provided to maintain the voltage on the respective gates of the inverter transistors at predetermined levels during operation of the device. The capacitor 80 is connected between the lead 64 and the first ground bus 57 so that, when it is charged, by a relatively high voltage on the lead 64, it will hold the gates of the transistors 62 and 63 at a voltage which is high relative to ground for a time period whose magnitude is determined by the rate of leakage of charge from the capacitor. The capacitor 81 is connected between the second ground bus 58 and the gates of the transistors 66 and 67, so that, when it is charged, it will hold these gates high with respect to ground.

As has been stated, external biasing and interconnections between the bus bars may be used to adapt the circuit 49 to a desired mode of operation. In the preferred mode, the busses 52 and 54 are connected together externally, as suggested by the dashed lines at 82, and the busses 55 and 56 are connected together, as indicated at 83. The two ground busses 57 and 58 are also connected together, as indicated at 84. In this example, the feedback transistor 79 is biased to its nonconductive state by a suitable voltage applied to the lead 60. The output is taken from the lead 78 and the lead 70 is not used. The circuit 49 is termed a "capacitive" scan generator when connected in this manner.

Figure 7:
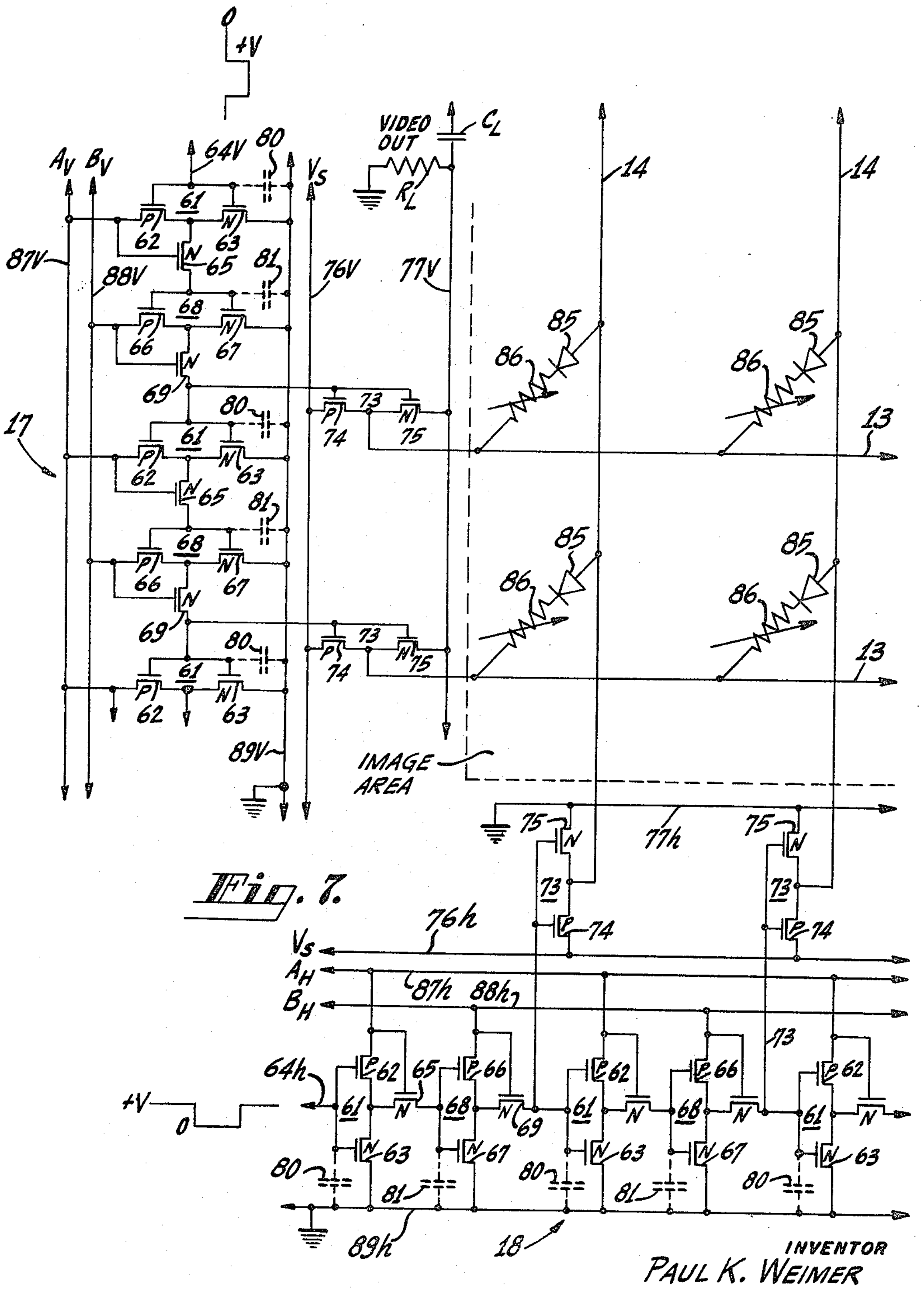
FIGURE 7 is a diagram of the equivalent circuitry of the present device.

A simplified circuit diagram incorporating capacitive scan generator stages, together with the circuitry of the image area and the connections of the scan generators thereto, is illustrated in FIGURE 7. In the actual structure of the device, bus bars corresponding to the several bus bars, 52, 54, 55, etc., illustrated in FIGURE 6 are present, but, because of the external connections of these bus bars to one another, as described in the preceding paragraph, the busses which are connected together are shown as single lines in FIGURE 7.

There is shown in FIGURE 7, a small portion of an image sensor panel, including two row conductors 13 and two column conductors 14 thereof. At each intersection between the row conductors 13 and the column conductors 14, there is provided a series combination of a diode 85 and a photoconductor 86 by means of the structure shown in FIGURE 2. The diodes 85 are provided to isolate each of the photoconductors 86 in the image area from the others, so that leakage of current between row and column conductors which are not being scanned is not possible.

The row conductors 13 are connected through respective output inverters 73 to the several stages of the vertical scan generator 17. The busses between which the transistors 74 and 75 are connected in the vertical scan generator 17 are designated 76*v* and 77*v* here, in order to distinguish them from the corresponding busses in the horizontal scan generator 18, which are there designated 76*h* and 77*h*. The bus 77*v* is the video output lead and is externally connected to suitable amplifying and transmitting circuitry, the impedance of which is diagrammatically represented by a capacitor $C_L$ and a load resistor $R_L$, connected between the lead 77*v* and ground.

The vertical scan generator 17 has a bus 87*v* which corresponds to the connected busses 52 and 54 of the circuit 49 in FIGURE 6. There is a second bus 88*v*, which corresponds to the connected busses 55 and 56 of FIGURE 6 and a ground bus 89*v* which corresponds to the connected ground busses 57 and 58 of FIGURE 6. The active circuitry between the busses here is the same as that shown in FIGURE 6. The feedback transistor 79 has been omitted from this illustration because it is not used when the scan generators are operated in the capacitive mode.

In the horizontal aspect of the image sensor, the column conductors 14 are connected through inverters 73 to the outputs of the several stages of the horizontal scan generator 18. The inverters 73 are connected between busses 76*h* and 77*h*, corresponding to the busses 76*v* and 77*v* in the vertical scan generator 17. The other busses in the horizontal scan generator are likewise designated by the same numerals as used in the scan generator 17 but with the suffix *h*. The active elements are again identical to those described with reference to FIGURE 6.

The busses 87*v* and 88*v* are externally connected to a pair of pulsed sources of voltage, not shown, which are complementary to each other. The frequency or pulse width of these complementary pulses determines the scan rate of the vertical scan generator 17, that is, the rate at which it transfers a pulse from one output to the next. The pulses are designated as clock pulse "A" and clock pulse "B" in the explanatory diagram of FIGURE 8. As shown there, the pulses shift between two voltages, one of which is substantially at ground potential and the other of which is somewhat higher, depending on the operating characters of the particular transistors selected as the transistors 62, 63, 66, 67, etc. For the structures which are to be described hereinafter, a voltage of +4 volts has been found to be adequate.

In a preferred mode of operation, the clock pulses A and B are not individually symmetrical. In particular, clock pulse A is normally at its low value for a larger part of each clock cycle and is high for only a short time at the end of a cycle. Clock pulse B is complementary to this, being high when clock pulse A is low and vice versa.

The vertical scan generator 17 propagates a positive pulse, that is, one which goes from 0 to about +4 volts. and back again. The manner in which this pulse is propagated will be explained with the aid of FIGURE 8 which illustrates the relationships between the clock pulses A and B and the voltages on the input lead 64*v* and on the gates of the output inverters 73 of the first two stages of the scan generator 17. The charge conditions on the capacitances 80 and 81 are also shown, in dashed lines.

In order to initiate operation of the vertical scan generator 17, a start pulse is applied to the input lead 64*v*. As shown in FIGURE 8, the start pulse has a width equal to the width of one clock cycle. Other pulse widths are also operative, although widths greater than one clock cycle will give degraded resolution in the picture transmitted by the image sensor. If the start pulse is narrower than one clock cycle, the circuit will nevertheless propagate an output pulse equal in width to a clock cycle and synchronized with the clock pulses, because it is the clock B pulse which is gated through the transistors 66 and 69 to constitute the output pulse. However, if the start pulse width exceeds the width of a clock cycle, the circuit will expand the start pulse and terminate it at the end of the next succeeding clock pulse. Thereafter, the circuit will propagate a pulse of the expanded width. For example, if the start pulse is 1½ times as wide as a clock cycle, the circuit will propagate an output pulse which is two clock cycles in width.

For the preferred case in which the start pulse is equal to or less than the width of a clock cycle, the circuit has a distinct advantage in that there is no overlap between successive output pulses. In particular, the circuit operates as follows.

Prior to the start pulse, in the interval between instants $t_0$ and $t_1$ in FIGURE 8 for example, the conditions within the first stage of the vertical scan generator 17 in the circuit of FIGURE 7 are as follows. The voltage on the bus 87*v* is low, because the clock A pulse is low, and the voltage on bus 88*v* is correspondingly high. The voltage on the input lead 64*v* is low, since the start pulse has not yet begun. The capacitance 80 is therefore uncharged.

Because the voltage on their gates is relatively low, the P type transistor 62 is enhanced to its conductive state and the N type transistor is non-conductive. The N type coupling transistor is non-conductive and the capacitance 81 is open-circuited. It will later be appreciated that, if the circuit has been operated for at least one half cycle with the clock A voltage high, this capacitance will be in a charged condition.

Assuming that the capacitance 81 is charged, the voltage on the gates of the transistors 66 and 67 in the inverter 68 is high and the P type transistor 66 is consequently non-conductive while the N type transistor 67 is conductive. The N type coupling transistor 69 is conductive because of the high clock B voltage on bus 88*v*. Thus, the gates of the transistors 74 and 75 in the output inverter 73 are at ground potential, being coupled to ground through the non-conductive transistors 69 and 67. At the same time, the capacitance 80 in the next succeeding stage is necessarily discharged, since it has both sides connected directly to ground. Because the inverter 73 of the first stage is effectively disconnected, the P type transistor 74 thereof is conductive and the first row conductor 13 therefore has the high voltage from the bus 65*v* applied to it. It will subsequently be apparent that the diodes 85 are reverse biased under these conditions and accordingly, no current flows.

In the interval between instants $t_1$ and $t_2$, before the start pulse goes high, it will be seen from FIGURE 8 that the clock A pulse is in its high voltage state and the clock B pulse is in its low state. Since the start pulse has still not begun, the voltage on the input lead 64*v* is near ground and, as a result, there is still no charge on the cpacitance 80. The P type transistor 62 of the first inverter 61 is in its conductive state, while the N type transistor 63 is non-conductive. Because of the relatively high voltage now on the bus 87*v* and, consequently, on the gate of the coupling transistor 65, this transistor will be conductive. There is, therefore, a conductive path for charging the capacitance 81 from the bus 87$v$ through the P type transistor 62 and then through the coupling transistor 65 to the capacitance 81 and from there directly to ground. Accordingly, during the interval from $t_1$ to $t_2$, the capacitance 81 will be charged, or recharged if it has been previously charged as noted above, to substantially the voltage then present on the lead 87$v$. The N type transistor 67 in the inverter 68 remains conductive and the P type transistor remains non-conductive. The N type coupling transistor 69 is now non-conductive becasue of the low voltage on the bus 88$v$, so the gates of the transistors in the output inverter are open circuited and remain in their low voltage condition.

The start pulse begins at the instant $t_2$ in FIGURE 8. The effect of the higher voltage of the start pulse is to charge the capacitance 80 of the first scan generator stage and to turn the P type transistor 62 off and the N type transistor 63 on. The low voltage on the bus 87$v$ during the interval from $t_2$ to $t_3$ renders the coupling transistor 65 non-conductive, thus isolating the capacitance 81 so that it holds its charge. The N type transistor 67 in the inverter 68 remains conductive and the output inverter 73 is again coupled to ground through the transistor 67 and the coupling transistor 69, which is conductive because the clock B voltage is now high again.

In the next half cycle, that is in the interval between $t_3$ and $t_4$ in FIGURE 8, the clock A pulse again goes high and the clock B pulse goes low. The transistor 63 is still conductive because of the high start voltage on its gate and the coupling transistor 65 now becomes conductive because of the high clock A voltage on bus 87$v$. Accordingly, a conductive path is provided from one side of the capacitance 81 to the other side thereof through the transistor 65 and the transistor 63, whereby the capacitance 81 discharges through the two transistors 65 and 63.

The discharge of the capacitance 81 brings the voltage on the gates of the transistors 66 and 67 to the low state, which switches the transistors 66 and 67 to the opposite condition in which the P type transistor 66 is on and N type transistor 67 is off. The voltage on the clock B bus 88$v$ is low at this time so that the coupling transistor 69 is non-conductive and the output voltage on the gates of the inverter 73 associated with the first stage remains therefore low.

In the preferred case, where the start pulse is equal in width to a clock cycle, as shown in FIGURE 8, the start pulse goes low at instant $t_4$, that is, at the same instant that the clock A pulse goes low and the clock B pulse goes high. In the interval between instants $t_4$ and $t_5$, the first half cycle after the start pulse, the conductivity conditions within the first stage of the vertical scan generator 17 are as follows. The P type transistor 62 is conductive because the voltage on its gate is now low, the start pulse having terminated. The complementary transistor 63 is therefore non-conductive. The coupling transistor 65 is non-conductive because the voltage on the bus 87$v$ is low at this time. Because the coupling transistor 65 is non-conductive, capacitance 81 is open circuited and remains in its discharged condition. The voltage on the gates of transistors 66 and 67 is therefore low so that P type transistor 66 is conductive and N type transistor 67 is non-conductive. The coupling transistor 69 is conductive because the voltage on its gate is the clock B voltage which is now high. Consequently, a conductive path is established between the clock B bus 88$v$ and the output inverter 73 of the first stage through the transistors 66 and 69. Thus, as shown in FIGURE 8, the output of the first stage goes high at the instant that the start pulse goes low. The output of the first stage of the scan generator 17 is also applied to the inverter 61 of the second stage of the scan generator 17. The output of the first stage constitutes a start pulse for actuating the second stage and the operation of the second stage in response thereto is exactly the same as has been described with reference to the first stage.

During the next interval, $t_5$ to $t_6$, the clock A voltage goes high and the clock B voltage goes low. Under these conditions, the P type transistor 62 is still conductive and the N type transistor 63 is still non-conductive because of the low voltage on the gates of these transistors. The coupling transistor 65 is now conductive, however, and capacitance 81 is accordingly recharged through the transistors 62 and 65 by the high voltage on the clock A bus 87$v$. This sets up the circuit to receive the next start pulse. Because of the high voltage now present on the gates of the transistors 66 and 67 in the second inverter 68, the P type transistor 66 is non-conductive and the N type transistor 67 is conductive. The coupling transistor 69 is non-conductive because of the low voltage now present on the clock B bus 88$v$. The output voltage on the gates of the inverter 73 is held high, however, by the charge on the capacitance 80 in the next stage.

At the instant $t_6$, when the clock A voltage goes low and the clock B voltage goes high again, the output of the first stage goes low because the circuit conditions are as follows. The transistor 62 is conductive and the transistor 63 is correspondingly non-conductive. The coupling transistor 65 is non-conductive because of the low voltage on bus 87$v$. The capacitance 81 is holding its charge. The P type transistor 66 in the second inverter 68 is non-conductive. The coresponding N type transistor 67 is conductive and the coupling transistor 69 is conductive so that a conductive path is provided for discharging the capacitance 80 in the next stage, allowing the output voltage to go back to ground potential. At the same instant, the output of the second stage goes high, and the pulse progresses through the scan generator in that manner. It will be noted that when the output pulse is received at each of the output inverters 73 connected to the scan generator 17, the N type transistor 75 in the inverter 73 is rendered conductive and a conductive path is thereby provided between the corresponding row conductor 13 and the video output lead 77$v$.

In the horizontal scan generator 18, a negative pulse, rather than a positive pulse, is propagated. Here, the voltage on the input lead 64$h$ is normally high and goes low temporarily to start the operation of the scan generator. Accordingly, each of the output inverters 73 of the horizontal scan generator 18 is normally at the high voltage level so that the N type transistors 75 are conductive. Thus, the column conductors 14 are normally at ground potential. No potential difference exists across those diodes 85 which are between a row conductor 13 which is being scanned by being effectively connected to the output bus 77$v$ and a column conductor 14 which is not being scanned, because both sides of these diodes are at ground potential. Reverse bias is present across those diodes which are between a row conductor 13 which is effectively connected to the lead 76$v$ through a P type transistor 74 and a column conductor 14 which is connected to ground through an N type transistor 75.

When the gates of an inverter 73 in the horizontal scan generator 18 are brought to a low voltage state in response to a start pulse, the N type transistor 75 is rendered non-conductive and the P type transistor 74 becomes conductive. A high voltage from the lead 76$h$ is consequently applied to the associated column conductor 14. The diode 85 which is connected between that column conductor 14 and the row conductor 13 which is effectively connected to the output bus 77$v$ will therefore be forward biased. Consequently, current can flow from the lead 76$h$ through the P type transistor 74 to the scanned column conductor 14 and to the diode 85 which is forward biased. Current then flows through that diode and its associated photoconductor 86 in an amount which is a function of the amount of light falling on that photoconductor. From there, the output path is through the row conductor 13 and the N type transistor 75 to the inverter 73 connected thereto and finally through the output bus 77$v$ and the load resistor $R_L$ to ground.

The rates at which the two scan generators 17 and 18 operate are determined by the frequency of the respective clock pulses applied thereto. Ordinarily, the vertical scan generators 17 is the slower of the two and will connect each row conductor 13 to the output lead 77*v* for a time long enough for the horizontal scan generator 18 to complete one cycle of its operation and thereby scan all the photoconductors 86 along that row. After that, the vertical scan generator 17 connects the succeeding row conductor 13 to the output so that the conductivity of its associated photoconductors 86 can be scanned. The sequence continues until all the photoconductors are scanned and then repeats itself. This may be accomplished automatically, for example, by connecting the output of the last stage of the scan generator to the input of the first stage. The output of the device accordingly is a train of voltages appearing across the load resistor $R_L$, each voltage representing light intensity information developed at one of the photoconductors 86.

Scan generator structure

A preferred structural embodiment of the scan generator circuit of FIGURE 6 is shown in FIGURES 9 to 21. Reference numerals used to designate the diagrammatically-shown circuit elements in FIGURE 6 will be used to designate the corresponding structural elements, as an aid in correlating the structure with the circuit.

As shown in FIGURE 7, there is one output stage of each of the scan generators 17 and 18 which is associated with each one of the row and column conductors 13 and 14 in the image sensor. Among other things, the structure hereinafter described minimizes the stage-to-stage spacing and the width of one stage of a scan generator so that the row and column conductors in the image area can be placed not only as closely together as possible but also so that a large number of row and column conductors may be employed in order to obtain good video resolution.

Figure 9:
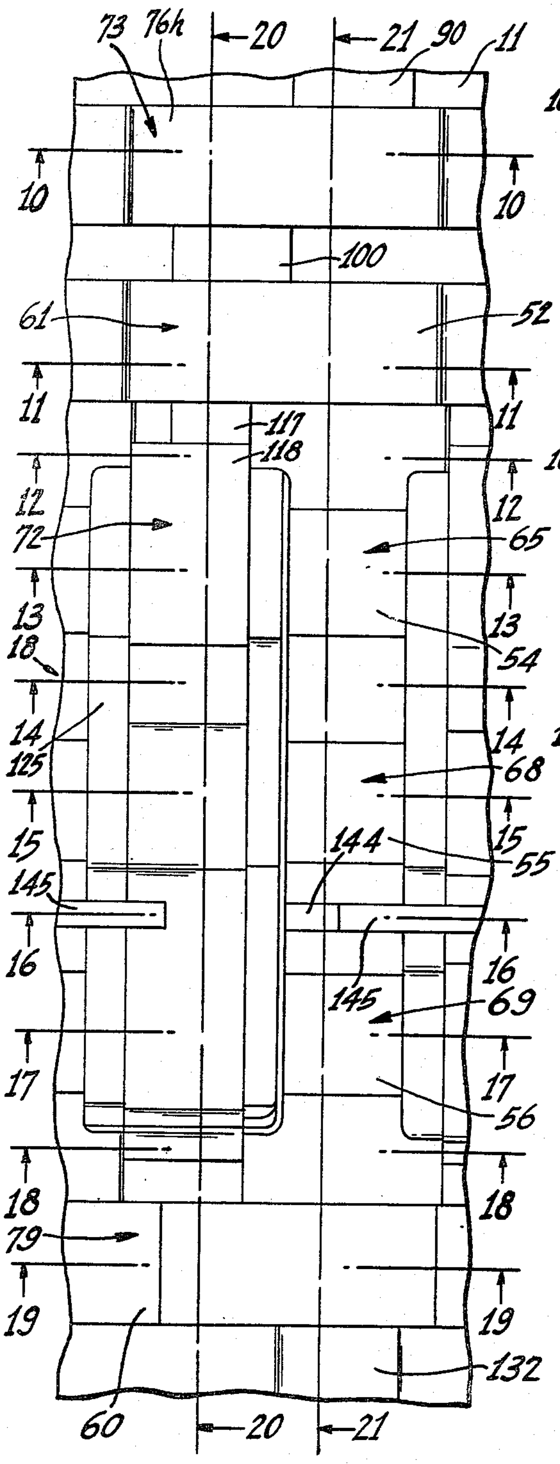
FIGURE 9 is a plan view of a portion of a scan generator, fully illustrating one stage and partially illustrating two adjacent stages thereof.

FIGURE 9 illustrates a portion of the structure of the horizontal scan generator 18 in plan view. The other scan generator 17 is identical. One complete stage is shown in FIGURE 9 and a small portion of each stage adjacent to this stage is also shown, in order to illustrate the relationship and spacing between stages.

As in the case of the single inverter illustrated in FIGURES 4 and 5, the elements of the scan generator stages shown in FIGURE 9 are deposited by thin film techniques on an insulating substrate 11. Beginning at the upper end of FIGURE 9, the first thin film element to be seen is a conductor 90 which extends vertically in the drawing from an output inverter 73 which is constructed in substantially the same manner as the inverter of FIGURES 4 and 5 and is actually the output inverter of the preceding stage as explained above. The conductor 90 is employed to connect the scan generator to a row or column conductor although it may be integral with a row or column conductor if all the elements of the circuit of FIGURE 7 deposited on one substrate. In FIGURE 9, the bus 76*h* is seen as the topmost element of the inverter 73.

Figure 10:
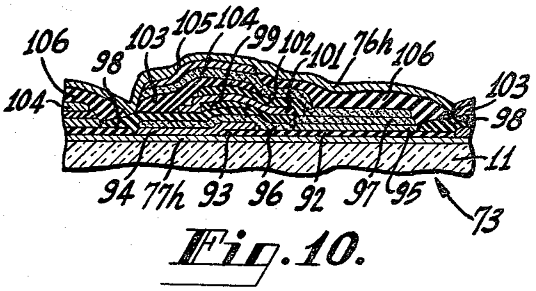

FIGURE 10 illustrates the various layers making up the output inverter 73 of FIGURE 9. The first element of this inverter is a layer of metal constituting the ground bus 77*h*. Deposited on the bus 77*h* is a layer of insulating material 92, which corresponds to the insulating layer 32 of the inverter shown in FIGURES 4 and 5. The insulating layer 92 has a terminal end 93, and a source electrode 94 is deposited in overlapping relationship with the end 93 of the insulating layer 92 and makes electrical contact with the bus 77*h*. One end 95 of the conductor 90, constituting a drain electrode, overlies the insulating layer 92 and has one of its ends spaced from the source electrode 94 so as to define a gap 96.

The next element of the inverter 73 is a layer of N type semiconductive material 97 which fills the gap 96 and overlaps the source and drain electrodes 94 and 95 to conductively join them together. Insulating layers 98 and 99 are next deposited over the source electrode 94 and the N type semiconductive layer 97 respectively; these insulating layers correspond to the layers 38 and 40 of the FIGURE 4 embodiment. A gate lead 100 (see FIGURE 9) is next deposited with its terminal end portion 101 constituting a gate electrode for the inverter 73. The gate electrode 101 overlies a substantial portion of the source electrode 94 and is insulated therefrom primarily by the insulating layer 98; this structure provides capacitance between the gate electrode 101 and ground. While this capacitance is not necessary in the output inverter 73, it is employed in the other inverters of the structure and is put into the inverter 73 to simplify the deposition layout by making all the inverters identical in structure.

The P type transistor of the inverter 73 is made up by the next succession of layers. Thus, there are insulating layers 102 and 103 deposited successively over the gate electrode 101 and the insulating layer 98, as shown. The insulating layer 102 is the gate insulator for the P type transistor and the insulating layer 103 is a stand off insulator corresponding to the insulating layer 44 of the FIGURE 3 embodiment.

A layer of P type semiconductor material 104 is deposited in overlying relation to a portion of the insulating layer 103, the gate insulating layer 102 and the drain end of the N type layer 97. In contrast to the FIGURE 4 structure, the P type material 104 does not extend into direct contact with the drain electrode 95. This variation was adopted for convenience in fabrication, allowing both the N and the P type semiconductor layers to be deposited through the same sized mask opening and in the same location. The arrangement does not adversely affect the operation of the device because the PN junction formed between the layers 104 and 97 is always forward biased during the operation of the device.

A second source electrode 105 lies above the first source electrode 94 and is in contact with the P type layer 104. A stand off insulating layer 106 is next provided and the bus 76*h* is deposited over the insulating layer 103, the second source electrode 105, and the stand off insulator 106.

Figure 11:
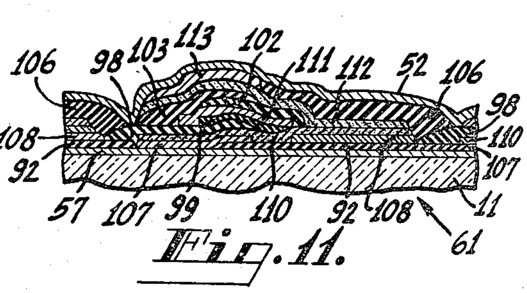

The inverter 61, shown in cross section in FIGURE 11, is constructed in exactly the same way and with the same sequence of depositions as the inverter 73. In fact, a comparison of FIGURES 20 and 21 with FIGURES 10 and 11 will show that some of the layers of these two inverters are common to both of the inverters.

Figure 20:
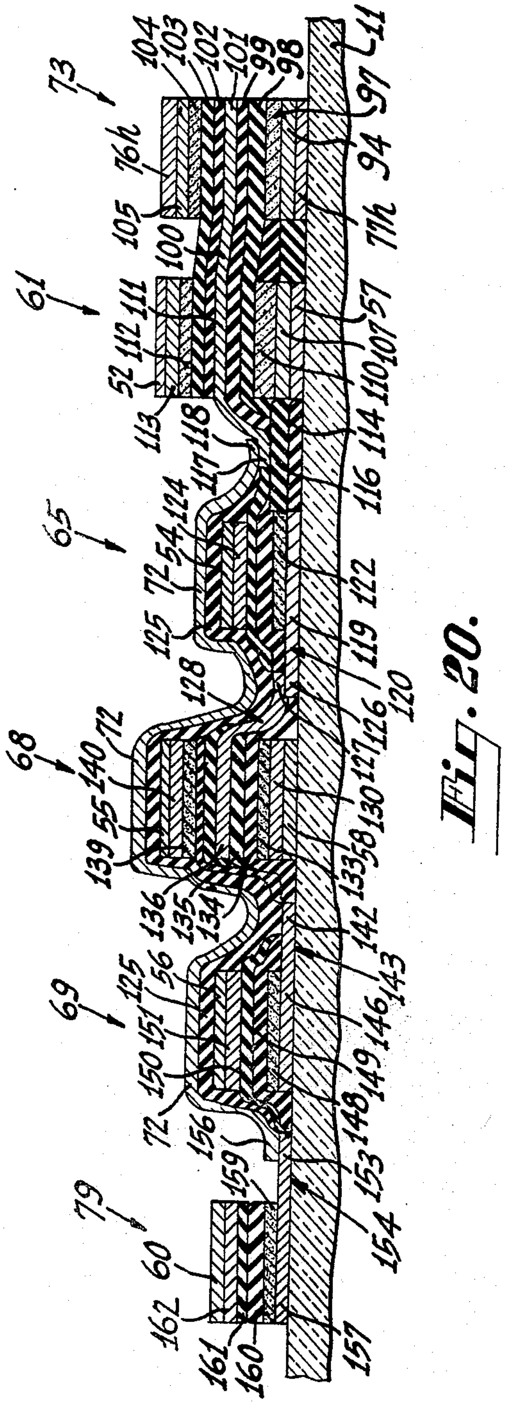
Figure 21:
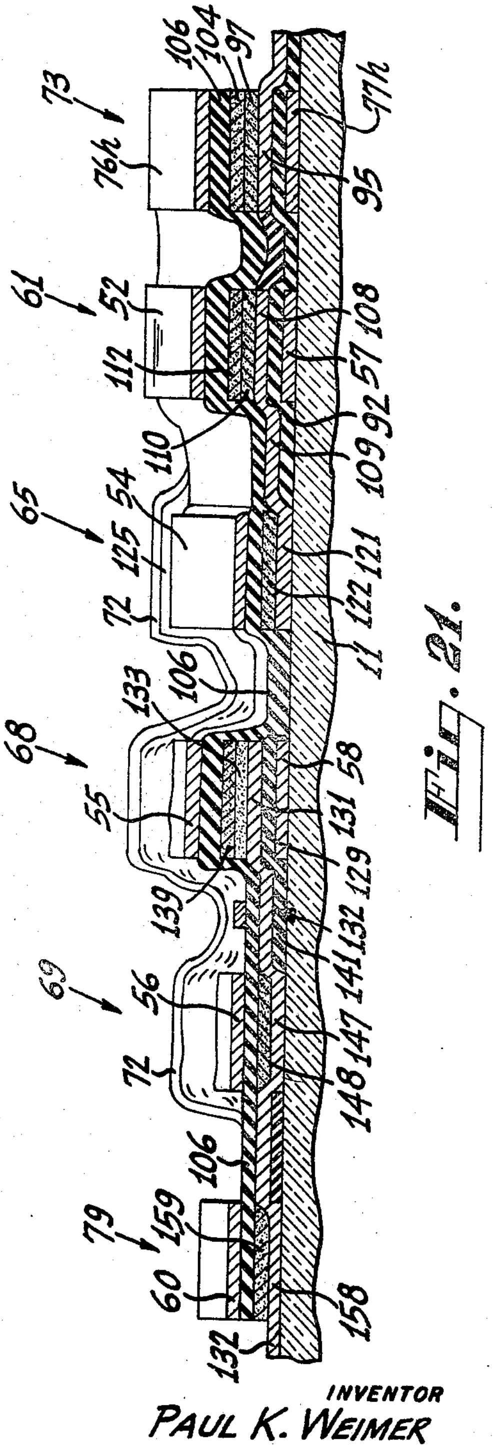

The first layer of inverter 61 is a ground bus 57. The insulating layer 92 overlies the bus 57 in the same relationship as in the inverter 73. As FIGURE 21 shows, the insulating layer 92 extends over both of the busses 57 and 57*b*. A source electrode 107 (FIGURE 20), the terminal end portion 108 of a drain lead 109 (FIGURE 21) and an N type layer 110 provide the source, drain and channel, respectively, for the N type transistor of this inverter. The gate insulator for the N type transistor and the dielectric for the capacitance 80 are provided in the inverter 61 by the insulating layers 98 and 99, which extend across the space between the inverters 73 and 61, as shown in FIGURE 20. Similarly, the gate electrode of this inverter is constituted by a portion 11 of the gate lead 100, which, like the gate electrode 101 of the inverter 73, also constitutes one plate of a capacitor, in this case the capacitance 80. The next two layers of the inverter 61 are the insulating layers 102 and 103 extending across from the inverter 73.

A P type layer 112 is deposited over the insulating layer 103, the gate insulating layer 102, and the N type material 110. The stand off layer 106, a source electrode 113, like the source electrode 105 of the inverter 73, and the bus 52 comprise the next succession of layers shown in FIGURE 11.

Figure 12:
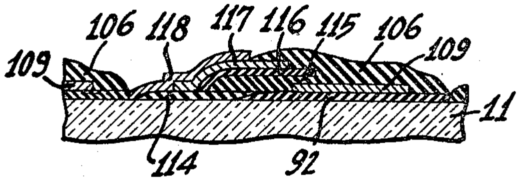

FIGURE 12 is provided to illustrate the manner in which certain elements of the inverter 61 are connected to the N type coupling transistor 65, and to other portions of the scan generator. The following layers are seen in this cross section. First, there is the insulating layer 92. To the left of the insulating layer 92 is a layer 114 of insulating material provided merely as a filler. The next layer is the drain lead 109, and this is followed by two insulating layers 115 and 116, a terminal end 117 of the gate lead 100, and a terminal end 118 of a vertically-oriented conductor 72. Compare FIGURE 6. The stand off insulator 106 also appears in this cross section.

Figure 13:
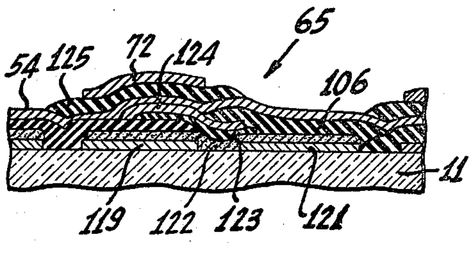

The coupling transistor 65 is shown in cross section in FIGURE 13. As reference to FIGURES 6 or 7 will show, the source and drain of the transistor 65 are not connected directly to any of the busses. Thus, in the structural layout, both are deposited directly on the substrate 11. A source electrode is defined by an end portion 119 of a source lead 120 on the substrate 11. An end portion 121 of the drain lead 109 constitutes a drain electrode for the transistor 65. A layer 122 of N type semiconductive material is deposited over the source electrode 119 and the drain electrode 121 and above that layer the insulator layer 116, a gate insulator 123, a gate electrode 124, the stand off insulator 106, and a bus 54 are deposited. Above the bus 54, a cross over insulator 125 and the conductor 72 can be seen.

FIGURE 14 illustrates the relationship of the interconnections between the transistor 65 and the second inverter 68. The source lead 120 has an end 126 which appears in FIGURE 14 as the lowermost metal layer on the substrate 11. In contact with the end 126 of the lead 120 is a terminal end 127 of a gate lead 128 going to the inverter 68. The insulating layers 106 and 125, and the conductor 72 are the other layers shown in FIGURE 14.

The inverter 68, itself, is shown in cross section in FIGURE 15; and, again, it is constructed in the same manner as the other inverters. Accordingly, FIGURE 15, shows, as the first layer on the substrate 11, a ground bus 58. An insulating layer 129 overlies the bus 58 and a source electrode 130 overlaps the end of the layer 129 and contacts the bus 58. An end 131, of a drain lead 132, constitutes a common drain electrode for the inverter 68. An N type semiconductor layer 133 joins the source and drain electrodes 130 and 131. Insulating layers 134 and 135 and an end portion 136 of the gate lead 128, constituting a gate electrode, are the next three layers of the inverter 68. The rest of the layers shown in FIGURE 15 are insulating layers 137 and 138, P type semiconductive layer 139, a second source electrode 140, and bus 55, the insulating layer 106, the stand off insulator 125 and the conductor 72. Capacitance 81 is provided by the gate and source electrodes 136 and 130, respectively, and the insulator layers 134 and 135.

The next cross section on FIGURE 9, i.e. FIGURE 16, illustrates the manner in which adjacent stages are connected to each other. The first layer above the substrate 11 in FIGURE 16 is a portion 141 of the insulating layer 129. An end portion 142 of a source lead 143 going to the transistor 69 overlaps an end of the insulating layer portion 141. The drain lead 132 and the insulating layer 106 are the next two layers above the layer portion 141. In electrical contact with the end 142 of the source lead 143 and overlying the insulating layer 106 is a first interconnecting lead 144 and, above that, there is the cross over insulator 125, and the conductor 72. A second interconnecting lead 145 is finally deposited in electrical contact with both the lead 144 and the conductor 72 of the next succeeding stage in order to complete the interconnection between stages. The source of the transistor 69 is accordingly connected to the common gate of the first inverter 61 in the next succeeding stage by a conductive path constituted by the interconnecting leads 144 and 145, and the conductor 72 of the next stage to the gate 111 of the first inverter thereof. The source lead 143 of the transistor 69 is also connected to the output inverter 73 at the top of the next succeeding column by means of the gate lead 100 thereof.

The transistor 69 itself is the next element below the inverter 68 in FIGGURE 9 and its cross sectional structure is illustrated in FIGURE 17. It will be apparent that the transistor 69 is exactly the same in cross section as the transistor 65. Directly on the substrate 11 is an end portion 146 of the source lead 143 and a portion 147 of the drain lead 132, constituting source and drain electrodes for the transistor 69. On these electrodes, the remaining elements of the transistor 69 are a layer 148 of N type semiconductive material conductively joining the electrodes 146 and 147, insulating layers 149 and 150 and a gate electrode 151. The insulating layer 106 appears in this cross section also and the final three layers shown are a bus 56, the cross over insulator 125 and the conductor 72.

FIGURE 18 shows the interconnection between the transistor 69 and the feedback transistor 79, which is the lowermost active element in FIGURE 9. In FIGURE 18, there is an insulating layer 152. Overlapping this layer is an end portion 153 of a source lead 154 going to the feedback transistor 79. A portion 155 of the drain lead 132 and the insulating layer 106 are disposed on the insulating layer 152. An end portion 156 of the conductor 72 makes contact to the end portion 153 of the source lead 154, effectively to couple the transistor 79 back to the common gate of the inverter 61.

The final horizontal cross section on FIGURE 9 is FIGURE 19, which illustrates the feedback transistor 79. This transistor is constructed in the same way as the transistors 65 and 69. An end 157 of the source lead 154 constitutes a source electrode for the transistor 79 and a portion 158 of the drain lead 132 is the drain electrode of this transistor. As reference to FIGURE 6 will show, the drain of the feedback transistor is an alternative output for the stage and, as FIGURE 21 shows, the drain lead 132 extends to the left from the feedback transistor 79 so that connection can be made thereto.

An N type semiconductive layer 159 is disposed over the electrodes 157 and 158 to conductively join them together. Above the semiconductive layer 159 are two insulating layers 160 and 161, the insulating layer 161 constituting the gate insulator for this transistor, and a gate electrode 162. The final two layers in FIGURE 19 are the insulating layer 106 and the bus 60.

The structure described herein is electrically equivalent to the circuit 49. For example, referring back to the description of the operation of the circuit as the vertical scan generator 17, consider the interval between the instants $t_1$ and $t_2$, when the capacitance 81 is charged, or recharged, by the voltage on the clock A bus 87*v*. In the structure, that voltage is present on the bus 52, since the bus 87*v* represents the busses 52 and 54, connected together by the external interconnection means 82.

During the interval from the instant $t_1$ to the instant $t_2$, a conductive path is established between the clock A bus 52 and the gate electrode 136 of the inverter 68 which, it will be recalled, also constitutes one plate of the capacitance 81. In particular, with reference to FIGURE 11, this path is from the bus 52 through the source electrode 113, the P type semiconductor 112, and the drain end of the N type semiconductor 110 (because of forward bias) to the drain electrode 108 of the inverter 61. From there, the path is through the drain lead 109, (FIGURE 21) the drain electrode 121, the N type semiconductor 122, and the source electrode 119 of the transistor 65 (FIGURE 13) to the source lead 120 (FIGURE 20). The path is completed from the source lead 120 to the gate lead 128 and finally to the gate electrode 136 of the inverter 68. Other correlations between the structure and the circuitry can be made in a similar manner.

Fabrication

The present device is preferably constructed by evaporation of the component materials by means of a parallel wire mask and associated photoetched masks of the type described, for example, in a paper entitled "A 180-Stage Integrated Thin Film Scan Generator" in the Proceedings of the IEEE for March 1966, page 354. In this method, a fine wire grill is mounted close to the glass substrate in a vacuum enclosure. The lateral position of the substrate relative to the wires can be adjusted from outside the vacuum enclosure. By moving the substrate between successive evaporations, gap spacings considerably smaller than the wire diameter can be deposited.

An additional set of movable masks positioned between the wire grill and the source of the material being evaporated serves to define the length of the evaporated strips in the direction parallel to the wires. Lateral movement of the substrate during evaporation is used to produce strips extending in the direction transverse to the direction of the wires in order to produce the relatively horizontal elements such as the various busses of this device.

The wire grill is arranged so as to produce strips which are 0.78 mil in width. This is the width of each of the metal connections which extends in the generally vertical direction in FIGURE 9, such as the source, drain, and gate electrodes, in one experimental embodiment of the present device. The horizontally-extending busses and the interconnection leads 144 and 145 are somewhat wider, although this does not appear in the drawings which are not to scale, their width being defined by the width of a slot in an auxiliary mask.

The spacing between the electrodes, that is, the width of the gap 96, for example, (FIGURE 10) is one third of the width of a metal layer in the present arrangement and accordingly, the gap width here is 0.26 mil. The space between adjacent stages, that is, the space between the right hand edge of the drain electrode 95, for example, and the left hand end of the source 94 of the inverter 73 in the next succeeding column is arbitrarily made the same as the gap distance. If one defines the width of a stage as the distance from the left edge of a source electrode to the left edge of the corresponding source electrode in the next succeeding column or stage, the total stage width is the sum of the widths of the source and drain electrodes, plus the gap between them, plus the space between the drain electrode and the source electrode in the next stage. In the experimental embodiment mentioned above, this distance is therefore 2.083 mils. The present device can accordingly be connected without fan-out to an image sensor panel in which the conductors are on 2.083 mil centers.

The structure of the present device has several features which contribute to efficiency in the deposition of the various elements. Referring to FIGURES 20 and 21, it will be apparent that all layers of metallization at a given level can be deposited at the same time. Thus, for example, all of the layers of metalization which are immediately adjacent to the substrate 11 can be deposited as the first step in the fabrication of the present device. This includes the bus bars 57, **77*h*, and 58 and the source and drain leads 120 and 143, for example. As a second example, the layout allows all materials of the same type, e.g., all semiconductive layers of a given conductivity type, to be deposited at the same time. Thus, the layout does not require that a particular material extend over one layer and under another layer of the same type of material, except for the interconnection between stages which is effected by the leads 144 and 145**.

Summary and conclusion

It should now be apparent that a structure adapted to provide extremely high resolution in a solid stage electro-optical translating device of convenient image area has been described. A compact scan generator having an output stage for each conductor in an image area is provided, each stage contraining, with its associated output inverter, a total of none transistors and each stage occupying a space only about two mils wide.

The minimization in stage-to-stage spacing is provided essentially by the novel arrangement of each stage with all the source, drain and gate electrodes of all the transistors mutually aligned in the direction parallel to the direction of the conductors in the image area. It suffices to state that gate electrodes have their centers aligned along a common axis because, as mentioned above, the functions of the source and drain electrodes may alternate during the operation of the device.

Close spacing of the scan generator stages is also aided by minimization of the number of interconnection leads required in each stage and by allowing insulated overlap between adjacent stages. A saving of space in the direction transverse to the stage-to-stage direction, that is, a lessening of the length of a stage is provided by the disposition of the several busses above and below the transistors and inverters to which they connect.

Because of the uniformity of conductor strip widths, spacings, and spacing tolerances, the present novel arrangement is suitable for efficient masking techniques, such as the wire grill technique outlined above. Photoresist masking may also be utilized conveniently in the fabrication of this device.

The use of separate busses to the several transistors and inverters in each scan generator stage affords the user a choice of circuits in operating this device. In addition, because output leads are available at both ends of a stage convenient access to the stages for testing and for bypassing defective stages is provided.

The present arrangement is adaptable to efficient high speed production techniques, because the entire circuit can be produced in a single pump-down of a vacuum deposition system. The arrangement results in a high yield of operative devices because the geometrical relationships between conductors are such that shorts or open circuit conditions are not likely to occur.

The structure described herein can be readily modified to a form having fewer stages, spaced correspondingly farther apart, without much change in the deposition process. By means of the present structure, it is possible to deposit auxiliary interconnection means in such a way that the present circuit can be connected in series-parallel relationship rather than in the series relationship described, thereby reducing the total number of stages, but providing redundancy within stages. The auxiliary interconnections are horizontally-extending busses, which connect the gate electrodes of the inverters 61 in a selected number of stages, and other busses which connect together the source electrodes of the several coupling transistors 69, the drains of the feedback transistors 79 and the output leads 90 of the several output inverters 73 of these stages.

This interconnection scheme provides several advantages, one of which is a convenient way of tailoring the characteristics of a given scan generator to a particular application. The redundancy introduced by the series-parallel connection greatly reduces the possibility of failure of the system. The tolerance for occasional open lines or poor connections is greatly improved. Finally, added power output capability results from the increase in the number of transistors in each stage. This is particularly useful for display applications where a relatively small scan generator may drive a large display by means of fan-out connections.

I claim:

1. An integrated device comprising:

a complementary pair of transistors of the type having a pair of spaced source and drain electrodes conductively joined by semiconductive material and a gate electrode disposed adjacent to the space between said electrodes and insulated from said semiconductive material, one transistor of said pair being superposed over the other and having its gate electrode and its drain electrode respectively in common with those of the other.

2. A device as recited in claim 1 wherein said transistors are thin film transistors.

3. A device as recited in claim 2 including an insulating substrate, and wherein said electrodes and said semiconductive material comprise successive layers of material supported by said substrate.

4. A device as recited in claim 3 including a first metal film disposed on said substrate and making contact with one of said source electrodes, and a second metal film, making contact with the other of said source electrodes, disposed above said layer.

5. An integrated thin film inverter device comprising:

an insulating substrate, a first source electrode supported on said substrate, a drain electrode supported on said substrate and spaced from said first source electrode so as to define a gap between said source and drain electrodes, a first layer of semiconductive material of one conductivity type in said gap and conductively joining said first source electrode and said drain electrode, a first layer of insulating material on said semiconductive layer over said gap, a gate electrode on said insulating layer and disposed over said gap, a second insulating layer over said gate electrode, a second layer of semiconductive material, of conductivity type opposite to that of said first layer of semiconductive material, said second layer of semiconductive material being disposed on said second layer of insulating material, said second layer of semiconductive material being in electrical communication with said drain electrode, and a second source electrode in contact with said second layer of semiconductive material, said second source electrode being spaced from said drain electrode to define a gap disposed vertically above said gate electrode.

6. A scan generator comprising a plurality of interconnected insulated gate field effect transistors on an insulating substrate, said transistors being disposed in a plurality of rows and a plurality of columns, the several transistors in each column having gates the centers of which are mutually aligned along a common axis.

7. A scan generator as recited in claim 6 wherein said transistors are interconnected by a plurality of conductive strips extending parallel to the respective rows of transistors and each being electrically connected to the same element of a corresponding transistor in each row.

8. A scan generator as recited in claim 7 wherein at least one of said conductive strips is disposed beneath the transistors to which it is connected.

9. A scan generator is recited in claim 7 wherein at least one of said conductive strips is disposed above the transistors to which it is connected.

10. A scan generator as recited in claim 6 wherein said scan generator also comprises a plurality of integrated inverter devices, each comprising a pair of thin film transistors, one of said thin film transistors being superposed on the other and having its gate and drain electrodes in common with those of the other, said common gate electrode being aligned with the gate of the individual transistors in said scan generator.

11. A scan generator as defined in claim 10 wherein the transistors in said inverters form complementary pairs, one transistor of each of said pairs being of conductivity type opposite to that of the other, the individual transistors of said scan generator being of the same conductivity type as said one transistor of said inverters, all transistors closest to said substrate in each of said rows having the same conductivity type.

12. A scan generator as recited in claim 10 wherein each column contains at least one of said inverter devices, located at such a position in the column that the inverter devices are disposed in one row.

13. A scan generator as recited in claim 12 wherein a conductive strip is disposed beneath said inverter devices and is electrically connected to the corresponding element of each inverter device.

14. A scan generator as recited in claim 12 wherein a conductive strip is superposed on said inverter devices and is electrically connected to the corresponding element of each inverter device.

15. A solid state construction for a scan generator circuit having a plurality of stages, each stage comprising a plurality of P type thin film enhancement insulated-gate field effect transistors, a plurality of N type enhancement insulated-gate field effect transistors, and means connecting said transistors in a predetermined circuit arrangement, comprising an insulating substrate, said transistors being deposited on said substrate in a plurality of rows and a plurality of columns, each column constituting one stage of said scan generator and having the transistors therein disposed with the centers of their gates aligned along a common axis.

16. A scan generator as defined in claim 15 wherein each column also includes an inverter device constituted by a complementary pair of said thin film transistors, one transistor of said pair being superposed on the other and having its gate electrode and drain electrode in common with those of the other.

17. A scan generator as defined in claim 16 wherein all transistors closest to said substrate in a particular row have the same conductivity type.

18. A scan generator circuit having a plurality of outputs and circuit means for producing a voltage pulse sequentially on successive ones of said outputs, said circuit means including a plurality of stages, one for each output, each stage comprising:

a first complementary inverter circuit having a P type enhancement field effect transistor and an N type enhancement field effect transistor, each transistor having a source, a drain, and a gate, said transistors being connected in series, with their drains connected together, across a first pulsed source of electrical potential, means for providing capacitance between the gates of said transistors in said first inverter circuit and one side of said first potential source, means for applying a voltage pulse to the gates of said transistors, a second complementary inverter circuit having a P type and an N type enhancement field effect transistor, each transistor having a source, a drain, and a gate, said last-mentioned transistors being connected in series, with their drains connected together, across a second pulsed source of electrical potential, means for providing capacitance between the gates of the transistors in said second inverter circuit and one side of said second potential source, an N type enhancement field effect transistor having its drain connected to the drains of the transistors in said first inverter circuit, its source connected to the gates of the transistors in said second inverter circuit and its gate connected to said first potential source, and an N type enhancement field effect transistor having its drain connected to the drains of the transistors in said second inverter circuit, its source connceted to the ouput of the stage and its gate connected to said second potential source.

19. A scan generator as recited in claim 18 wherein said first and second potential sources are connected to the several transistors in the respective stages of said scan generator by a plurality of buses, a first bus being connected to the sources of the P type transistors in the first inverter circuits, a second bus being connected to the gates of the first coupling N type enhancement field effect transistors, a third bus being connected to the sources of the type transistors in the second inverter circuits, a fourth bus being connected to the gates of the second coupling N type transistors, a fifth bus being connected between ground and the sources of the N type transistors in the first inverter circuits, and a sixth bus connected between ground and the N type transistors in the second inverters.

20. A scan generator as recited in claim 19 further comprising a feedback N type enhancement field effect transistor in each state, said feedback transistor having its source connected to the gates of the transistors in said first inverter and its drain connected to the drains of the transistors in the second inverter, the gate of said feedback N type transistor being connected to a seventh bus.

21. A solid state digitally scanned electro-optical translating device comprising;

an insulating substrate, a plurality of strips of photoconductive material on said substrate, a plurality of row conductors and a plurality of column conductors on said photoconductive strips, said row and column conductors being insulating from each other and making contact with said photoconductive strips in such a way that said row and column conductive strips in such a way that said row and column conductors are joined at each intersection therebetween by an elemental portion of said photoconductive strips, and digital scan generator means connected to each of said row and column conductors, said scan generator means comprising a solid state circuit deposited on said substrate, said circuit having a plurality a stages each having an output, said outputs having a center-to-center spacing substantially equal to the center-to-center spacing of said row and column conductors.

22. A solid state electro-optical translating device comprising:

a plurality of row conductors and a plurality of column conductors, each in mutually parallel arrangement, and digital scanning means for applying a voltage pulse to each of said row conductors and column conductors in predetermined sequence, said digital scanning means having a plurality of stages, each stage having an output connected to one of said row or column conductors, the width of each of said stages being less than the combined width of one of said row or column conductors and the space between adjacent row or column conductors.

23. A digitally scanned electro-optical translating circuit comprising:

an image area containing a plurality of row conductors and a plurality of column conductors in insulated relationship therewith and defining a plurality of intersections, means defining a unidirectional current element and an electro-optical element connected in series between each of said row conductors and said column conductors at each intersection therebetween, digital scanning means comprising a scan generator circuit connected to each of said row conductors, said scan generator circuit having a plurality of outputs, said outputs being respectively in electrical communication with said plurality of row conductors, and circuit means for propagating a voltage pulse of one of two polarities in time sequence from one output to the next, a complementary-pair inverter circuit interposed between each output and its associated row conductor for applying a voltage pulse of the other of said two polarities to each row conductor in sequence, digital scanning means comprising a scan generator circuit connected to each of said column conductors, said scan generator circuit having a plurality of outputs, said outputs being respectively in electrical communication with said plurality of column conductors, and circuit means for propagating a voltage pulse of one of two polarities in time sequence from one output to the next, and a complementary-pair inverter circuit interposed between each output and its associated column conductor for applying a voltage pulse of the other of said two polarities to the last-mentioned voltage pulse is applied to each column conductor in sequence.

References Cited

UNITED STATES PATENTS

| | | | |
|---|---|---|---|
| 3,260,863 | 7/1966 | Burns et al. | 307—88.5 |
| 3,287,611 | 11/1966 | Bockemuehl et al. | 317—235 |
| 3,322,974 | 5/1967 | Ahrons et al. | 307—88.5 |
| 3,348,074 | 10/1967 | Diemer | 307—88.5 |
| 3,378,783 | 4/1968 | Gibson | 330—35 |
| 3,388,292 | 6/1968 | Burns | 315—169 |

JOHN W. HUCKERT, Primary Examiner

R. F. POLISSACK, Assistant Examiner

U.S. Cl. X.R.

307—303, 304, 311; 317—234, 235